US007463415B2

(12) United States Patent
Shafer

(10) Patent No.: US 7,463,415 B2
(45) Date of Patent: Dec. 9, 2008

(54) SYSTEM FOR COLLECTING AND DISPLAYING IMAGES TO CREATE A VISUAL EFFECT AND METHODS OF USE

(76) Inventor: Eugene Lee Shafer, 101 Southeast 6th, Marietta, OK (US) 73448

( * ) Notice: Subject to any disclaimer, the term of this patent is extended or adjusted under 35 U.S.C. 154(b) by 627 days.

(21) Appl. No.: 10/947,806

(22) Filed: Sep. 23, 2004

(65) Prior Publication Data

US 2005/0099685 A1 May 12, 2005

Related U.S. Application Data

(63) Continuation of application No. 10/283,747, filed on Oct. 29, 2002, now Pat. No. 6,865,023.

(51) Int. Cl.

| | |
|---|---|
| ***G03B 21/56*** | (2006.01) |
| ***G03B 21/60*** | (2006.01) |
| ***G03B 21/28*** | (2006.01) |
| ***G02B 27/22*** | (2006.01) |
| ***G02B 26/08*** | (2006.01) |
| ***A63G 31/16*** | (2006.01) |
| ***F21V 7/00*** | (2006.01) |
| ***H04N 5/66*** | (2006.01) |

(52) U.S. Cl. ....................... 359/445; 359/444; 359/451; 359/458; 359/462; 359/207; 472/58; 472/60; 362/279; 362/342; 353/99; 348/739

(58) Field of Classification Search ......... 359/443–455, 359/458–459, 462, 207; 472/57–58, 60; 362/279, 330, 325, 342, 354; 353/79, 122, 353/77–78, 98–99; 348/739

See application file for complete search history.

(56) References Cited

U.S. PATENT DOCUMENTS

| | | | | |
|---|---|---|---|---|
| 1,526,715 | A | 2/1925 | Moon et al. | 359/451 |
| 1,834,177 | A | 12/1931 | Petrowsky | 359/445 |
| 1,880,279 | A | 10/1932 | Raven | 359/445 |
| 2,273,074 | A | 2/1942 | Waller | 359/451 |
| 2,999,322 | A | 9/1961 | Hemstreet | 434/43 |
| 3,026,770 | A | 3/1962 | Smith | 359/451 |
| 3,260,156 | A | 7/1966 | Komitor | 359/445 |
| 3,295,910 | A | 1/1967 | Hourdiaux | 359/451 |
| 3,469,837 | A * | 9/1969 | Heilig | 472/60 |
| 3,623,802 | A * | 11/1971 | Hubner | 353/23 |
| 3,692,364 | A | 9/1972 | Kimura et al. | 359/445 |
| 3,695,751 | A | 10/1972 | Watanuki | 352/70 |
| 4,070,098 | A * | 1/1978 | Buchroeder | 359/725 |
| 4,354,737 | A | 10/1982 | Dotsko et al. | 359/443 |
| 4,500,163 | A | 2/1985 | Burns et al. | 359/15 |
| 4,696,554 | A | 9/1987 | Seawright | 359/853 |
| 6,409,351 | B1 | 6/2002 | Ligon | 353/98 |
| 6,733,136 | B2 * | 5/2004 | Lantz et al. | 353/79 |

* cited by examiner

*Primary Examiner*—Diane I. Lee
*Assistant Examiner*—Magda Cruz
(74) *Attorney, Agent, or Firm*—Dunlap Codding, P.C.

(57) ABSTRACT

A system (and its methods of use) for collecting and displaying images so as to create a visual effect and, more particularly but not by way of limitation, a three-dimensional visual effect.

5 Claims, 9 Drawing Sheets

SYSTEM FOR COLLECTING AND DISPLAYING IMAGES TO CREATE A VISUAL EFFECT AND METHODS OF USE

CROSS REFERENCE TO RELATED APPLICATIONS

The present application is a continuation of U.S. Ser. No. 10/283,747, filed Oct. 29, 2002 now U.S. Pat No. 6,865,023, the contents of each of which are hereby expressly incorporated herein by reference in their entirety.

1. FIELD OF THE INVENTION

The present invention relates in general to a system (and its methods of use) for collecting and displaying images so as to create a visual effect and, more particularly but not by way of limitation, a three-dimensional visual effect.

2. BRIEF DESCRIPTION OF THE BACKGROUND

Since the ability of man to first capture and retransmit an image, there has been a desire to retransmit, project, or view the captured image in a more life-like three-dimensional configuration.

Known three-dimensional visual affect systems traditionally include a screen which is spherical in configuration. However, the sight lines for such spherically configured screens are oftentimes undesirable, in that, the bottom front of such spherically configured screens usually curves up and away from the audience thereby requiring the audience to watch the movie reclined or with their heads uncomfortably tilted backward. Furthermore, transmission of sound through such spherical screens is sometimes impeded and a spherical type screen configuration oftentimes results in unnecessary construction costs. Other types of three-dimensional visual affect systems utilize a screen having three or more horizontally angled panels. This configuration of screen, however, is known to cause visible lines of demarcation in the projected image.

Therefore, there exists a need in the field of visual imaging for a system that: (1) can be economically constructed; (2) provides for a three dimensional image affect having desirable sight lines for audience comfort; and (3) has improved image quality and clear transmission of sound. It is to such a system and objectives, among others, that the present invention is directed, although one of ordinary skill in the art would be capable of observing and appreciating other fields of endeavor to which the presently disclosed and claimed invention would apply.

DETAILED DESCRIPTION OF THE DRAWINGS

Figure 1:
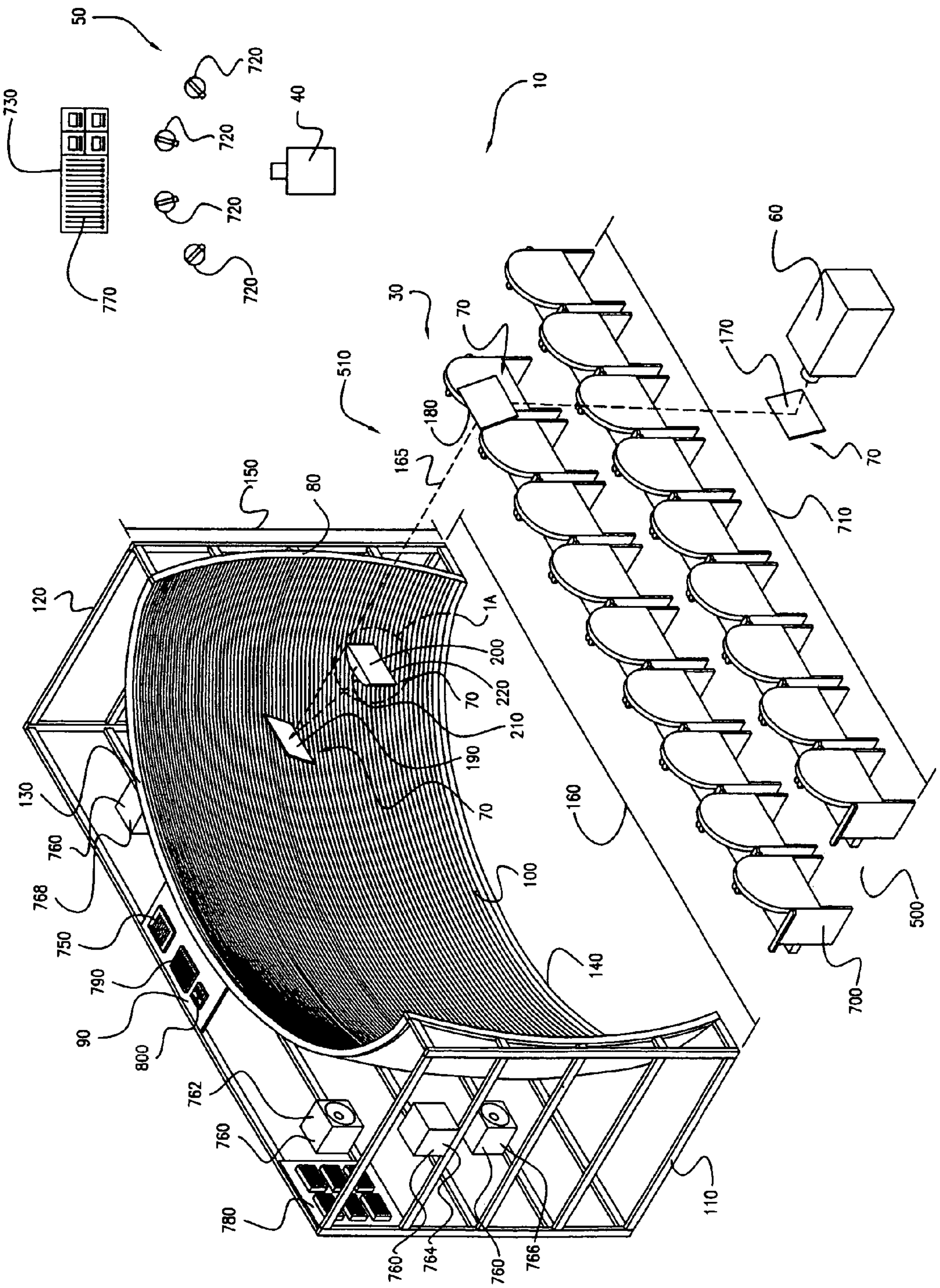
FIG. 1 is a side plan view of a system in accordance with the present invention.
Figure 1A:
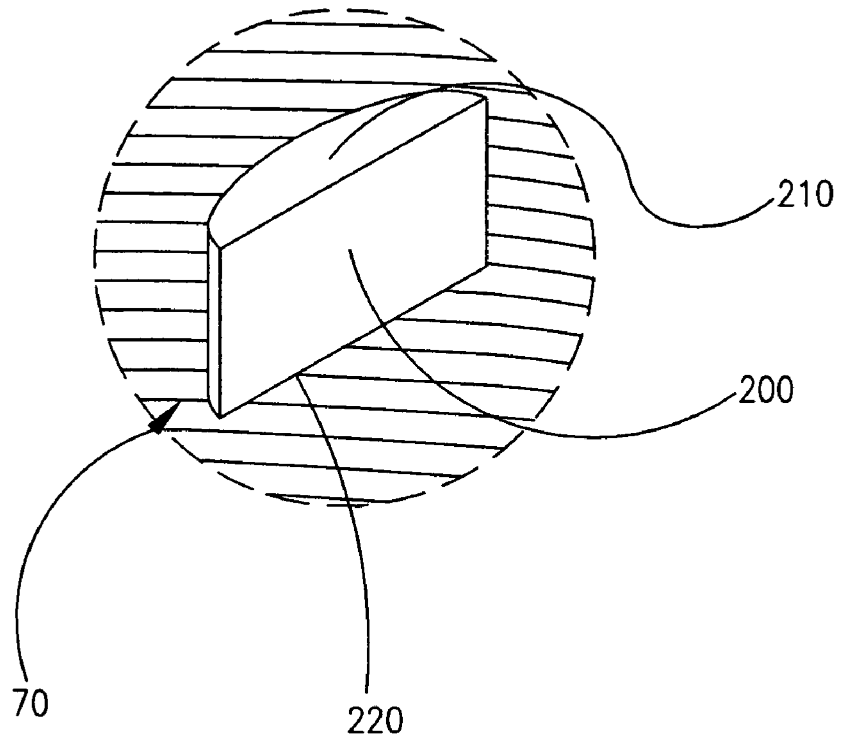
Figure 1B:
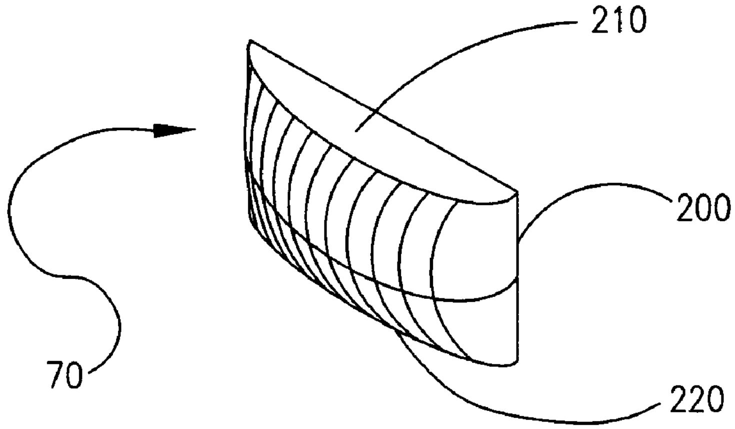

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for purpose of description and should not be regarded as limiting.

Referring now to FIG. 1 shown therein is a system 10 for capturing and projecting images so as to create a visual effect, such as a three-dimensional visual effect, constructed in accordance with the present invention. The system 10 broadly includes an image capturing assembly 20 and an image projection assembly 30. The image capturing assembly 20 and the image projection assembly 30 are configured and coordinated so as to capture and project images and sound in such a manner as to create a capture visual effect, such as a three-dimensional visual effect.

The image capturing assembly 20 includes at least one camera 40 capable of capturing at least one still image or capable of capturing a sequence of a plurality of images such as the plurality of images that create a motion picture, and a sound recording assembly 50 capable of recording sounds in coordination and conjunction with the images captured by the camera 40 of the image capturing assembly 20.

The image projection assembly 30 includes at least one projector 60, compatible with the camera 40 of the image capturing assembly 20, for projecting the at least one still image or the sequence of a plurality of images captured by the camera 40 of the image capturing assembly 20. Additionally, the image projection assembly 30 includes a plurality of mirrors 70 capable of reflecting the image projected by the at least one projector 60, and a screen 80 for receiving and displaying the image or images that are projected by the at least one projector 60 and a sound system 90 capable of reproducing sounds recorded by the sound recording assembly 50 of the image capturing assembly 20. The camera 40, the at least one projector 60, the sound recording assembly 50, the sound system 90 the plurality of mirrors 70 and the screen 80 are all coordinated such that the still image and/or the plurality of sequential images collected by the camera 40 of the image capturing assembly 20 are projected by the projector 60, received and reflected by the plurality of mirrors 70 and received by the screen 80 while being synchronized by the sound system 90, that is playing the sounds recorded by the sound recording assembly 50 to thereby create a visual effect such as the three-dimensional visual effect.

The screen 80 of the image projection assembly 30 includes a concave reflecting surface 100 having a first side 110, a second side 120, a top 130, a bottom 140 (FIG. 8), a height 150 (FIG. 8) which extends from the top 130 to the bottom 140 of the concave reflecting surface 100, and a width 160 which extends from the first side 110 to the second side 120 of the concave reflecting surface 100 of the screen 80.

In one particular embodiment of the presently claimed and disclosed invention, the system 10 is a motion picture process, i.e. a process designed to capture a plurality of sequential images in the horizontal plane in a range from about 140 degrees to about 180 degrees, more typically in a range from about 170 degrees to about 50 degrees but most preferably 160 degrees and in the vertical plane in a range from about 40 degrees to about 80 degrees, more typically in a range from about 50 degrees to about 70 degrees but most preferably about 58 degrees.

The plurality of mirrors 70 reflect, direct and correct images 165 projected by the image projection assembly 30 from the point where the images 165 leave the at least one projector 60 so that these images 165 are thereafter received by the concave reflecting surface 100 of the screen 80. The plurality of mirrors 70 channel the images 165, correct optical distortion of the images 165 and conform the images 165 to the concave reflecting surface 100 of the screen 80 on which the images 165 are displayed.

As shown, in the particular embodiment of FIG. 1, a first mirror 170 of the plurality of mirrors 70 receives the images 165 from the at least one projector 60 of the image projection assembly 30 and reflects the images 165 to a second mirror 180. The second mirror 180 receives the images 165 reflected from the first mirror 170 and reflects the images 165 received from the first mirror 170 to a third mirror 190. The third mirror 190 receives the images 165 reflected from the second mirror 180 and reflects the images 165 to a fourth mirror 200. Preferably, the first mirror 170, the second mirror 180, and the third mirror 190 all have a substantially flat surface. It is also preferred that fourth mirror 200 have a substantially curved surface.

The first mirror 170 is located substantially at or near the same level as the at least one projector 60 of the image projection assembly 30 and aligned in a range from 45 degrees from a vertical plane created by the alignment of first mirror 170 with the at least one projector 60 of the image projection assembly 30 so as to reflect the images 165 upward and thereby changing the direction of travel of the images 165 toward the second mirror 180.

The second mirror 180 is preferably located near, at or above the level of the top 130 of the concave reflecting surface 100 of the screen 80, and tilted most preferably at an angle of about 45 degrees, such that the second mirror 180 is tilted and aligned so as to redirect the path of the images 165 toward the third mirror 190. The third mirror 190 is located above the concave reflecting surface 100 and may even be slightly behind the concave reflecting surface 100 of the screen 80. The third mirror 190 is tilted from about 10 degrees to about 50 degrees, and functions to redirect the images 165 back in the general direction from which the image came (i.e. towards the at least one projector 60 of the image projection assembly 30), and downward, so that the images 165 will strike the fourth mirror 200.

The fourth mirror 200 has a substantially curved surface. The fourth mirror 200 is generally positioned so that an uppermost part 210 of the fourth mirror 200 is at or near the same level as the top 130 of the concave reflecting surface 100 of the screen 80. It is located approximately equal-distance from all points of the top 130 of the concave reflecting surface 100, making it centered, relative to the top 130 of the concave reflecting surface 100. The fourth mirror 200 has a substantially even curvature along its horizontal lines, and the amount of curvature is in a range from about 60 degrees to about 100 degrees, more preferably in a range from about 70 degrees to about 90 degrees but most preferably 80 degrees. The curvature along its vertical lines is inconsistent. The least amount of curvature per inch occurs near the uppermost part 210 of the fourth mirror 200, and the greatest amount of curvature occurs near a bottom portion 220 of the fourth mirror 200, with the increase in graduation being substantially uniform and consistent from the uppermost part 210 of the fourth mirror 200 to the bottom portion 220 of the fourth mirror 200. The fourth mirror 200 is preferably flared so as to substantially counter the effect of having the images 165 strike the fourth mirror 200 from a slightly elevated position.

Those skilled in the art will readily recognize and understand that the third mirror 190, alternatively, may be a curved mirror which would handle distortion correction of the images 165 in the vertical plane and the fourth mirror 200, alternatively, may be a curved mirror which would handle distortion correction of the images 165 in the horizontal plane and then project the images 165 on to the concave reflecting surface 100. Of course, the opposite would be equally applicable.

Those skilled in the art will also readily recognize and understand that the system 10 may also include more or less flat mirrors than the first, second and third flat mirrors 170, 180, and 190, respectively. Furthermore, those skilled in the art will readily recognize and understand that although the first, second and third mirrors 170, 180, and 190, respectively, are shown and described in particular positions in relation to the at least one projector 60 and the concave reflecting surface 100, the positions of the first, second and third flat mirrors 170, 180, and 190, respectively, in relation to the at least one projector 60 may be varied without departing from the spirit and scope of the invention.

Figure 2:
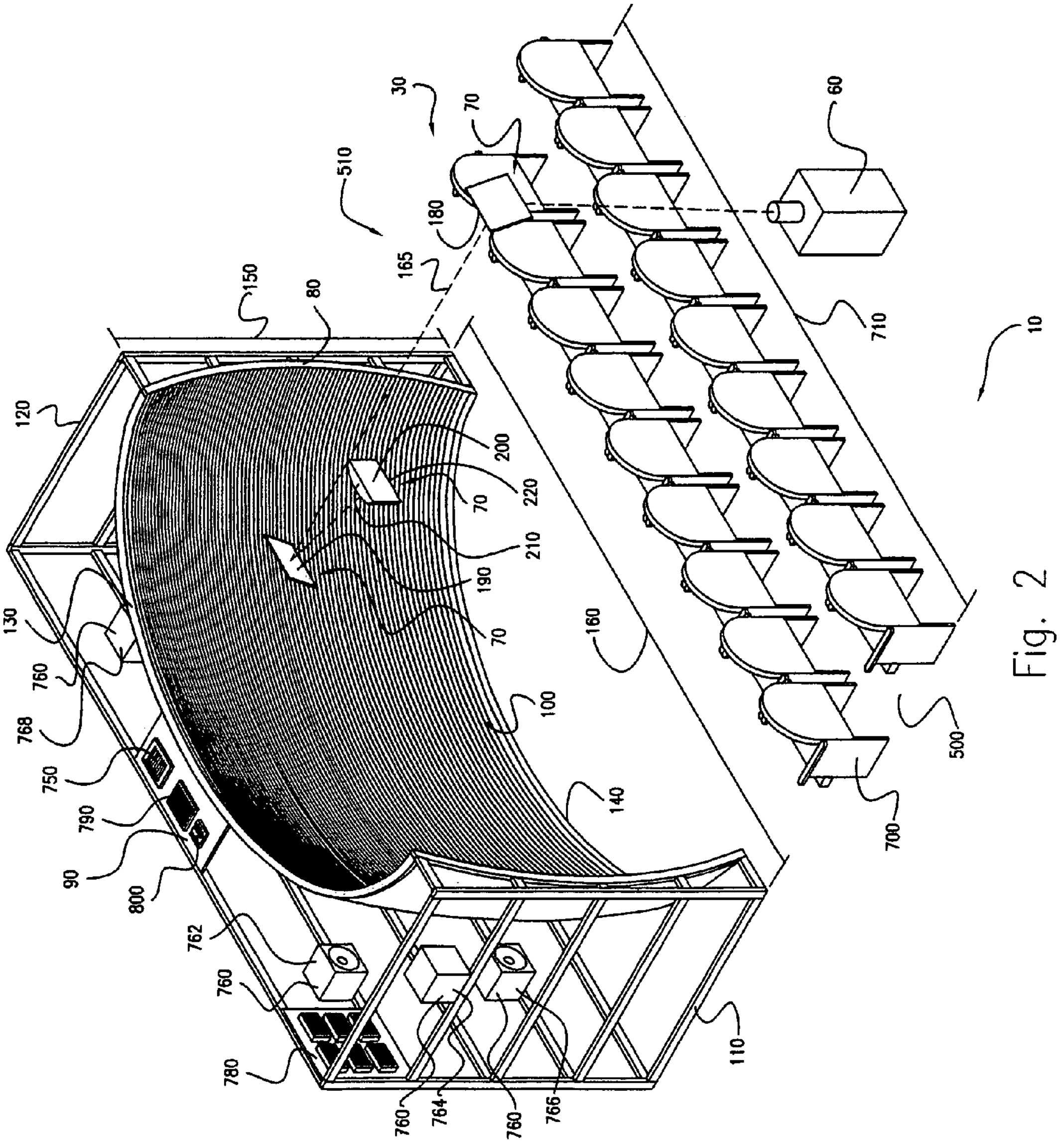
FIG. 2 is another embodiment of the system of FIG. 1.

Referring now to FIG. 2, for instance, in another embodiment, the first mirror 170 may be eliminated from the system 10 by orienting the at least one projector 60 so as to project the images 165 directly onto the second mirror 180.

Figure 3:
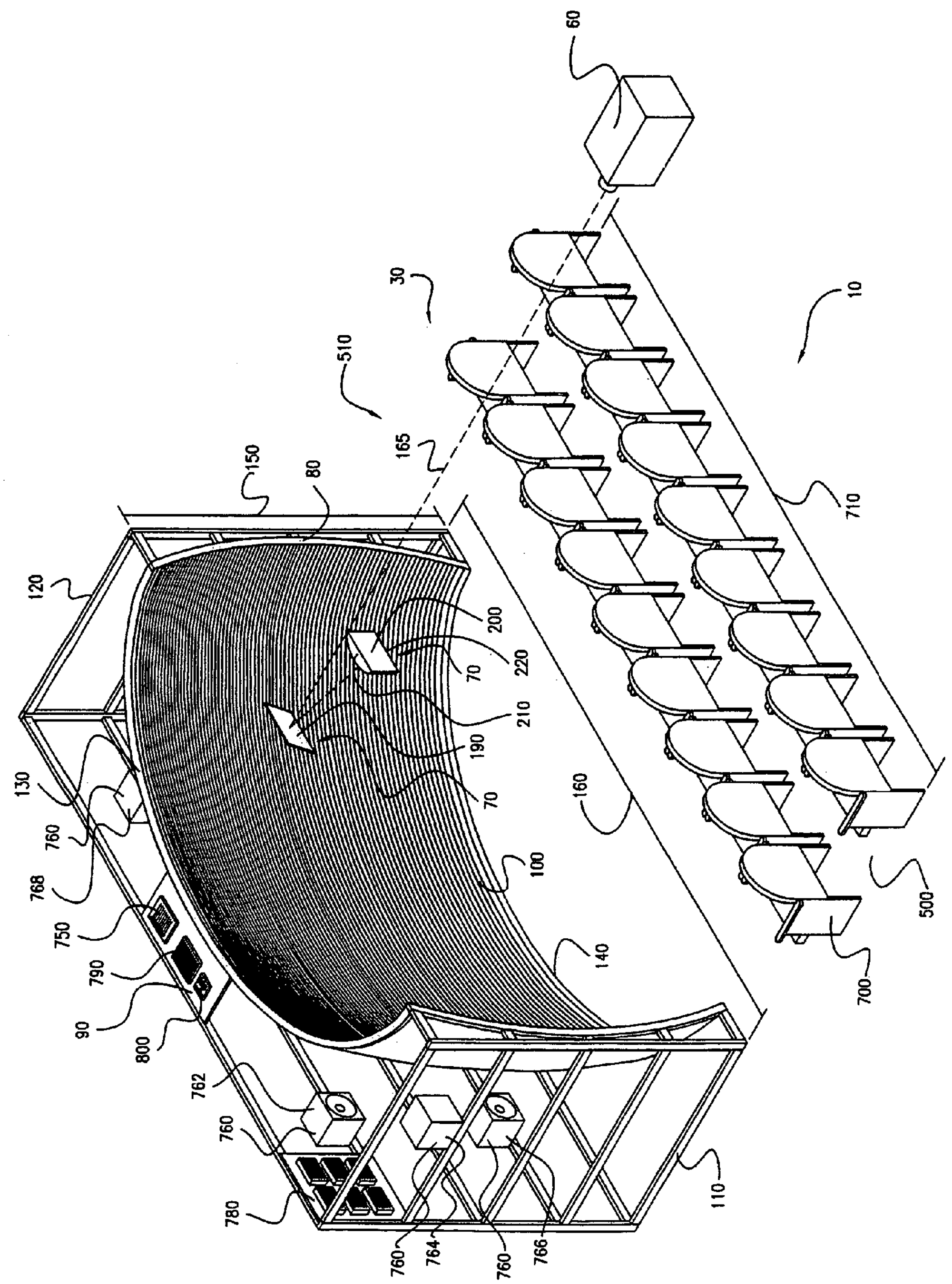
FIG. 3 is another embodiment of the system of FIG. 1.

Referring now to FIG. 3, in another embodiment, the first mirror 170 and the second mirror 180 may be eliminated from the system 10 by orienting the at least one projector 60 so as to project the images 165 directly onto the third mirror 190.

Figure 4:
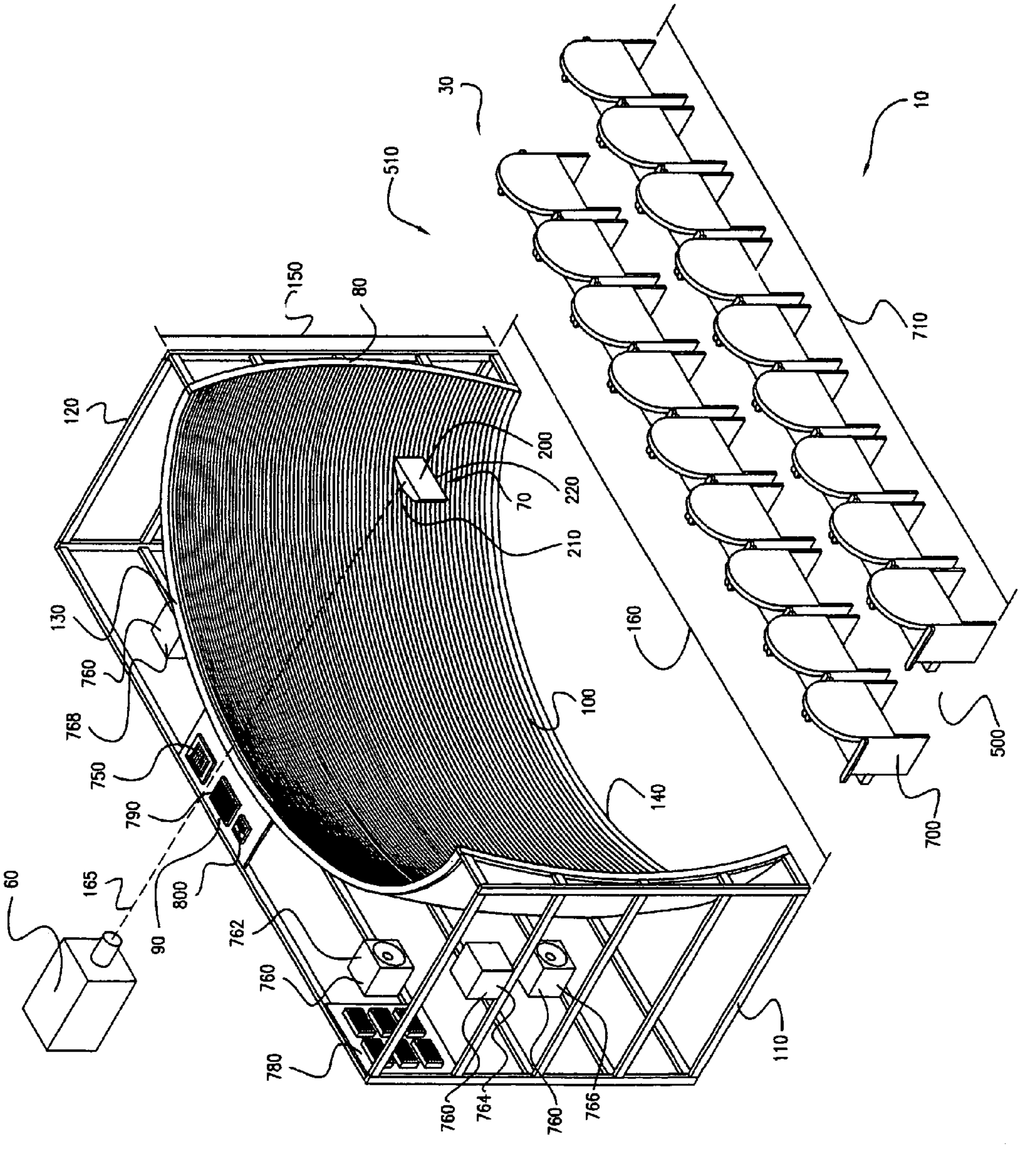
FIG. 4 is another embodiment of the system of FIG. 1.

Referring now to FIG. 4, in yet another embodiment, the first, second and third mirrors 170, 180, and 190, respectively, may be eliminated from the system 10 by disposing the at least one projector 60 behind and above the top 130 of the concave reflecting surface 100 and projecting the images 165 directly onto the fourth mirror 200.

Figure 5:
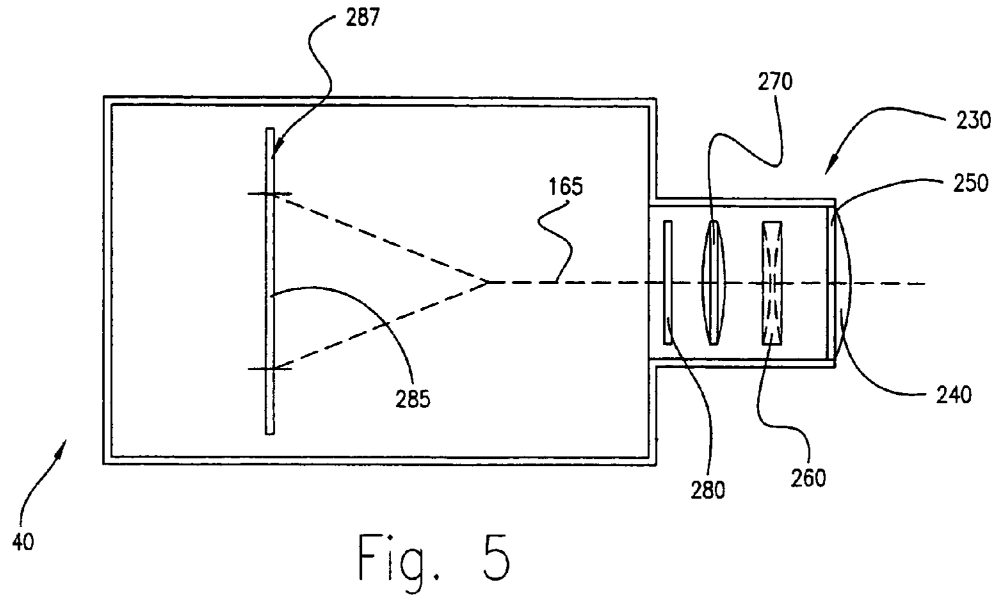
FIG. 5 is a partial cutaway view of components of the recording system of FIG. 1.

Referring now to FIG. 5, the camera 40 includes a taking lens 230 capable of encompassing a field of view in the horizontal plane in a range from about 140 degrees to about 180 degrees, more preferably in a range from about 150 degrees to about 170 degrees but most preferably about 160 degrees and capable of encompassing a field of view in the vertical plane in a range from about 40 degrees to about 80 degrees, more preferably in a range from about 50 degrees to about 70 degrees and most preferably 58 degrees. The taking lens 230 of the camera 40 preferably makes the images 165 compatible to the dimensions of a film frame in the range most preferably about 65 mm. The taking lens 230 includes an aperture 240, a fisheye element 250, at least one enlarging element 260, at least one anamorphic element 270, and a plurality of focusing elements 280. The fisheye element 250 is typically smaller than what is traditionally considered useful for use with the taking lens 230 in order to maintain a focal length in a range from about 5 mm to about 45 mm, more preferably in a range from about 15 mm to about 35 mm and most preferably about 25 mm. The short focal length increases the depth of field of the taking lens 230, and enhances the illusion of reality of the system 10. The at least one enlarging element 260 increases the size of the images 165 such that the images 165 substantially fills a frame 285 of a motion picture film negative 287. The at least one taking lense anamorphic element 270 of the taking leans 230 squeezes the images 165 so that the images 165 ratio is in the range from about 2.5:1 to about 2.9:1, more preferably in the range from about 2.6:1 to about 2.8:1 and most preferably the images 165 ratio is about 2.7:1, such that, the images 165 will fit within the frame 285 with the frame 285 ratio in a range from about 2.0 to about 2.4, more preferably in the range from about 2.1 to about 2.3 and most preferably about 2.2:1. The squeeze of the at least one anamorphic element 270 of the taking lens 230 is in a squeeze range ratio from about 1.1 to about 1.5 more preferably in a squeeze range ratio from about 1.2 to about 1.35, and most preferably a squeeze range ratio of about 1.25:1. This squeeze range ratio allows for a margin for framing the images 165 during projection. Although the scope of the taking lens 230 is typically approximately 180 degrees, only an approximate 160 degree portion of the images 165 will fit completely inside a 65 mm negative, such as motion picture film negative 287. This is beneficial in three ways. First, the shorter focal length increases the depth of field of the images 165. Second, the shorter focal length provides information outside the normal scope of the images 165 preventing black borders from showing when errors occur. Third, since some wide angle lenses show a drop off in brightness near the outside edges utilizing an enlarging element 260 that is 20 degrees wider than the portion of the images 165 that falls on the frame 285 of the motion picture film negative 287 allows the dark portion of the images 165 to fall outside the area of the frame 285.

Figure 6:
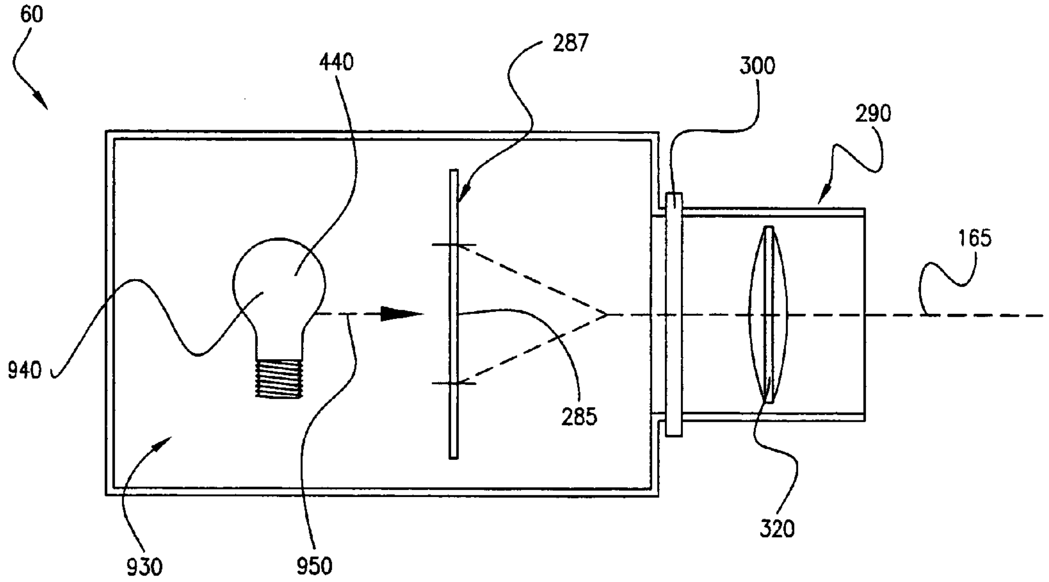
FIG. 6 is a partial cutaway view of system of FIG. 1.

Referring now to FIG. 6, the at least one projector 60 rapidly and sequentially projects the images 165 collected by the camera 40. The at least one projector 60 includes a compensating projection lens 290 for restoring the images 165. The compensating projection lens 290 is similar to a regular motion picture projection lens, in that, the compensating projection lens 290 will have a focus ring 300. The compensating projection lens 290 also includes at least one anamorphic element 320 to restore the "squeezed" images 165 back to its original ratio format. The optical elements of this compensating projection lens 290 are arranged so as to project the images 165 in a substantially straight beam with little expansion of the beam (i.e., telephoto). Adjustment controls (not shown) for the compensating projection lens 290 allow the broadness or narrowness of the beam to be controlled. The focus of the compensating projection lens 290 is in a range from about 80 feet to about 300 feet, more preferably in a range from about 100 feet to about 200 feet, most preferably is set at about 160 feet and adjustable at the at least one projector 60. Because of the nature of the projection, additional focus may need to be done with the focus ring 300 on the compensating projection lens 290 itself.

Figure 7:
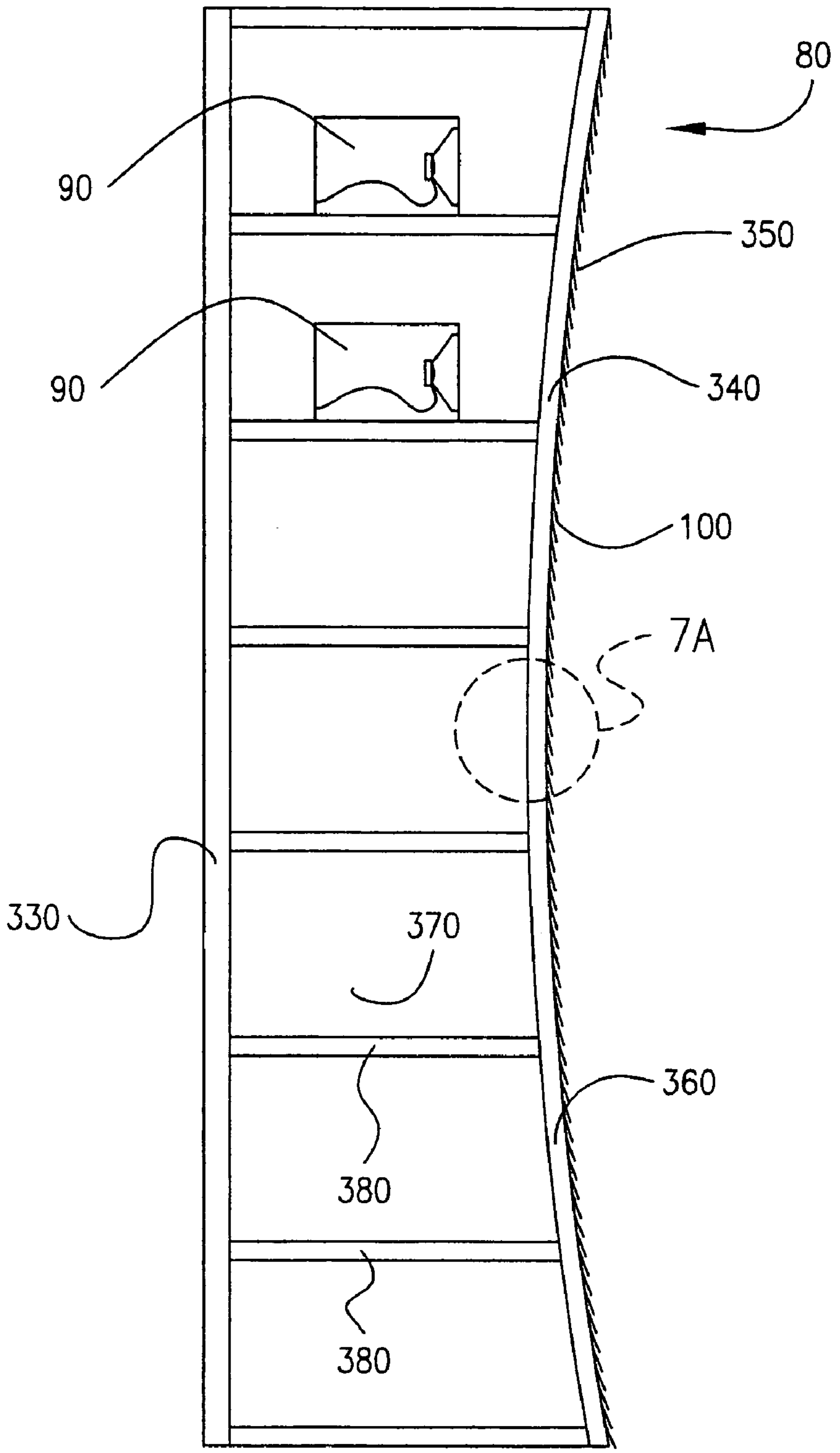
FIG. 7 is a side view of a component of the system of FIG. 1.

Referring now to FIG. 7, the screen 80 includes a frame 330, for supporting at least a portion of the sound system 90, a plurality of panels 340 and a plurality of louvers 350 attached to the plurality of panels 340 of the screen 80. The plurality of louvers 350 properly attached to the plurality of panels 340 form the concave reflecting surface 100 of the screen 80 of the images 165 projection assembly 30.

The frame 330 is a scaffold-like structure and is constructed from any material suitable for supporting the plurality of panels 340, the plurality of louvers 350 and at least a portion of the sound system 90 such as, by way of example but not limitation wood, metal, plastic composite material or combinations and derivations thereof. The frame 330 has a front 360 and a back 370. The front 360 of the frame 330 is generally sized and configured so as to form the plurality of panels 340, which are attached to the front 360 of the frame 330, into a substantially concave configuration. The back 370 of the frame 330 includes a plurality of platforms 380 for supporting at least a portion of the sound system 90.

Figure 7A:
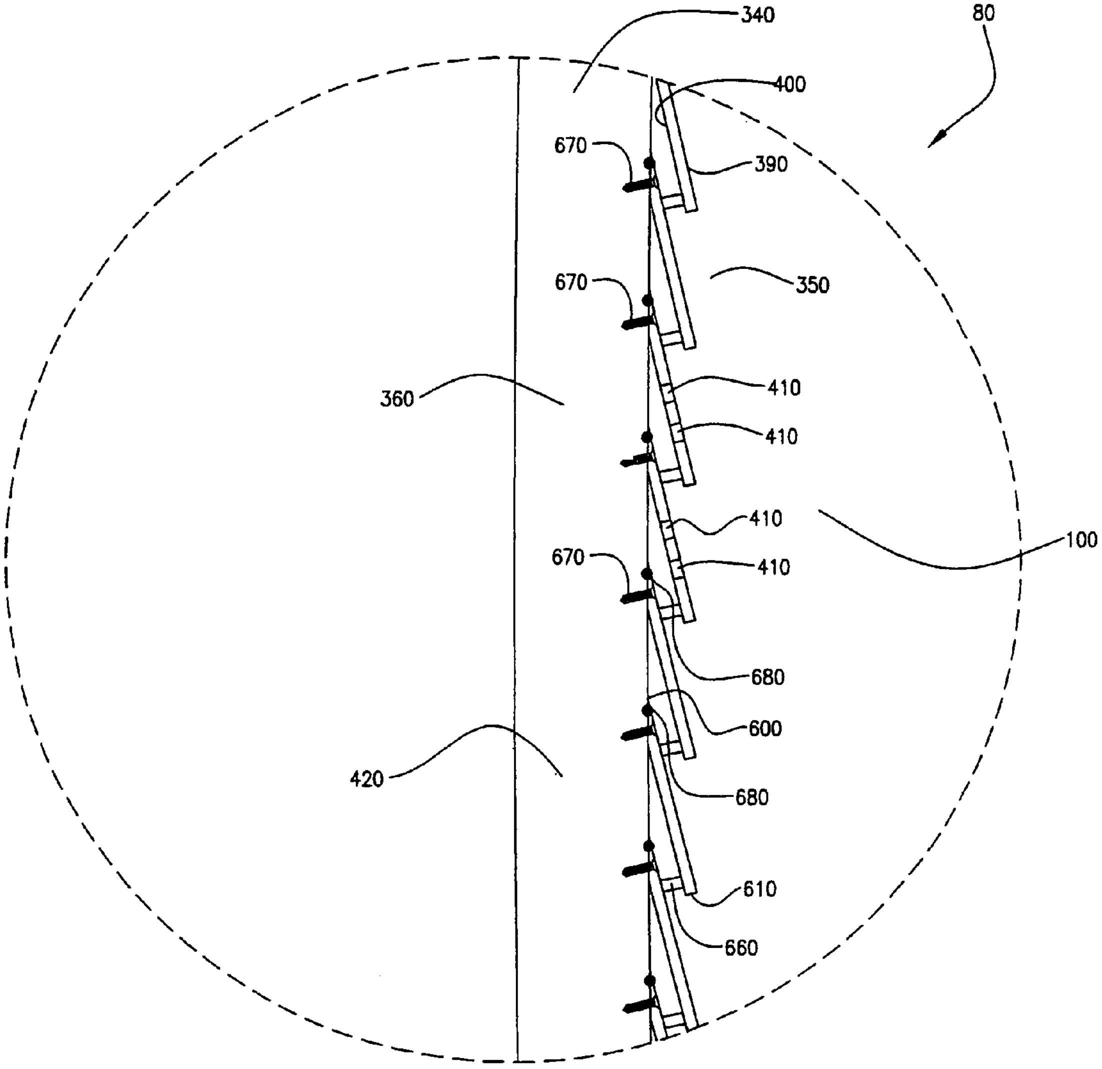

The plurality of panels 340 may be constructed from any material suitable for being attached to the frame 330 and suitable for supporting and attaching the plurality of louvers 350 such as, by way of example but not limitation, sheets of plywood, fiberboard, wood, metal, plastic, composite material or combinations and derivations thereof. As shown in FIG. 7A, the plurality of panels 340 have a front side 390 and a backside 400 and at least the front side 390 of the plurality of panels 340 is substantially flat. A plurality of holes 410 are disposed through the plurality of panels 340 so as to permit sound to permeate through the plurality of panels 340. The front side 390 of each of the plurality of panels 340 is inherently non reflective or coated with a nonreflective substance such as black paint. The plurality of louvers 350 are attached to the front side 390 of the plurality of panels 340 with a plurality of fasteners 420.

The light source 440 (FIG. 6) which carries the images 165 to the concave reflecting surface 100 of the screen 80 is not channeled from the back of the auditorium, as is the case in a traditional prior art film presentation, but will come from above and slightly in front of the concave reflecting surface 100 of the screen 80 as directed by the plurality of mirrors 70. This enables the concave reflecting surface 100 of the screen 80 and the images 165 projected thereupon to go all the way to a floor 500 of a theater 510 (FIG. 1). Therefore, the audience does not have to look upward at the images 165 projected onto the concave reflecting surface 100 of the screen 80 but will visualize the projected images 165 in the manner in which objects are viewed in real life.

The plurality of louvers 350 serve at least six different functions. The plurality of louvers 340 keep the projected images 165 sharp and prevent a "comma" effect. Secondly, the plurality of louvers 350 provide for a sharper images 165 by reducing the angle of inclination at which the projected images 165 strikes the concave reflecting surface 100 of the screen 80. Third, the plurality of louvers 350 prevent the ghosting effect caused by light reflecting from the top 130 to the bottom 140 of the concave reflecting surface 100 of the screen 80, and vice-versa. Any light reflected upward and downward will either miss the plurality of louvers 350 below due to redirection, or be buried under the plurality of louvers 350 above it. Fourth, the plurality of louvers 350 provide a higher resolution images 165 because, unlike a normal movie screen, the plurality of louvers 350 are not porous. Because the plurality of louvers 350 are solid, the 15-20 percent of the projected images 165 that is normally lost back stage is instead directed toward the audience. A fifth function of the plurality of louvers 350 is to allow and direct sound transmission through the screen 80 toward the audience. Normally a movie screen is filled with holes in order to allow sound to penetrate the screen. This causes the loss of as much as 20% of images 165 information. The plurality of louvers 350 allows 100% of the images 165 information to be received by the audience. A sixth function of the plurality of louvers 350 is to focus the projected images 165, so that the audience receives the brightest possible images 165 with minimal lose of projected images 165 on the ceiling or walls.

Figure 8:
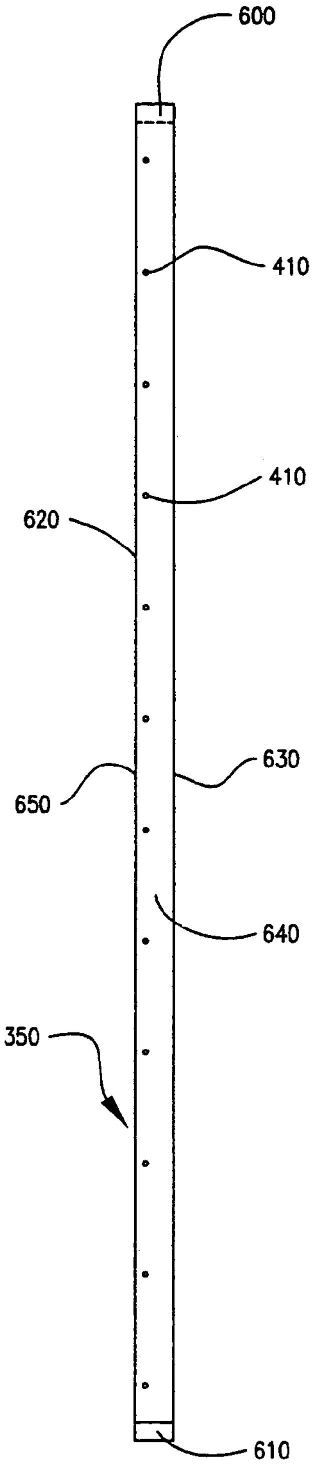
FIG. 8 is a partial exploded side view of a of the system of FIG. 7.
Figure 9:
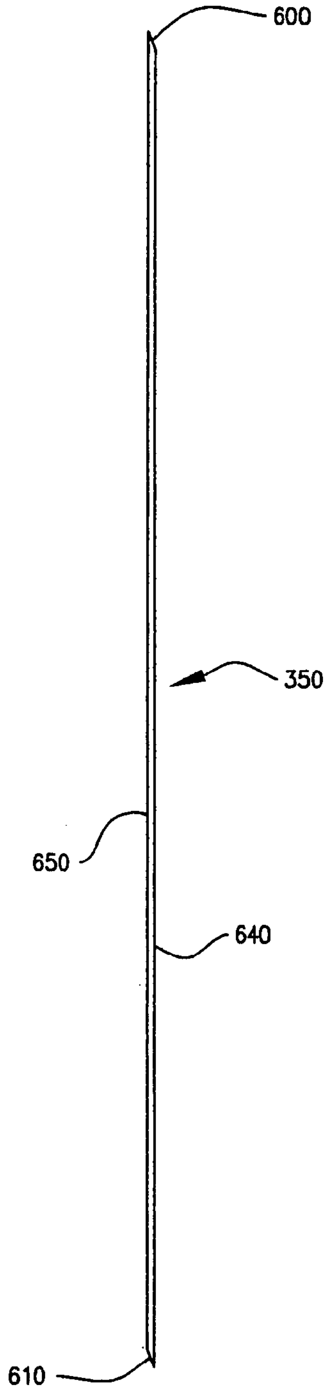
FIG. 9 is a front view of a component of the system of FIG. 8.

Referring now to FIGS. 8-9, the plurality of louvers 350 are elongated and preferably rectangular in configuration. The plurality of louvers 350 can be composed of any substantially non porous material suitable for use as plurality of louvers 350 such as wood, metal, plastic, composite material, or combinations and derivations thereof. Each of the plurality of louvers 350 has a top 600, a bottom 610, first end 620, a second end 630, a front 640 and a back 650. The front 640 of each of the plurality of louvers 350 is highly reflective or coated with a highly reflective material such as white or silver paint. The back 650 of each of the plurality of louvers 350 is highly non reflective or coated with a highly non-reflective material such as black paint. Each of the plurality of louvers 350 run horizontally around the plurality of panels 340. Each of the plurality of louvers 350 maintain the same elevation across the plurality of panels 340 such that the plurality of louvers 350 are substantially parallel and level. The plurality of louvers 350 are horizontally mounted one above the next such that the bottom 610 of each of the plurality of louvers 350 overlaps the top 600 of each of the plurality of louvers 350 assembled in the immediate row below. The bottom 610 of each of the plurality of louvers 350 is inclined in a range from about 1 degrees to about 40 degrees, more preferably in a range from about 10 degrees to about 20 degrees and most preferably about 14 degrees from the plurality of panels 340 such that the front 640 of each of the plurality of louvers 350 generally reflects the images 165 received from the fourth mirror 200 toward the audience. An even distance between the plurality of louvers 350 is maintained by a plurality of spacers 660 placed at regular intervals. The plurality of louvers 350 are angled such that the bottom 610 of each of the plurality of louvers 350 is closer to the audience than the top 600 of each of the plurality of louvers 350.

The plurality of louvers 350 are attached to the plurality of panels 340 by a series of fasteners 670 that are positioned across the length of the plurality of louvers 350. The first end 620 of each of the plurality of louvers 350 is preferably angle spliced to the second end 630 of each of the horizontally adjacent plurality of louvers 350, alternatively, each second end 630 is shaved and joined to each of the horizontally adjacent plurality of louvers 350 by an overlap joint. The angle splicing or overlap preferably hides the series of fasteners 670 and the plurality of spacers 660. The plurality of louvers 350 are separated from one another by a bead of caulk 680 or other such suitable bonding and/or sealing material known to those of ordinary skill in the art. The bead of caulk 680 is placed along the bottom 610 of the back 650 of the plurality of louvers 350, making it stand off of each of the plurality of louvers 350 in an adjacent row immediately below. The plurality of spacers 660 and the series of fasteners 670 and the bead of caulk 680 are preferably inherently nonreflective or coated with a nonreflective substance such as black paint. The front side 390 of the plurality of panels 340 to which the plurality of louvers 350 are attached are also inherently highly nonreflective or coated with a nonreflective material such as black paint.

The plurality of louvers 350 once properly attached to the front side 390 of the plurality of panels 340 form the concave reflecting surface 100 of the screen 80. The concave reflecting surface 100 is preferably sized and shaped such that the first and second sides 110 and 120, respectively, of the concave reflecting surface 100 extends to adjacent or past a first row of seats 700 found on the floor 500 of the theater 510 immediately adjacent the bottom of the concave reflecting surface 100 (FIG. 1). The chord of the concave reflecting surface 100 should be greater than a width 710 of the first row of seats 700 immediately adjacent to the bottom 140 of the concave reflecting surface 100. The height 150 of the concave reflecting surface 100, not adjusted for curvature, is most preferably from about one-half of the measure of the chord. However, the height to chord ratio can be in a range from about 2:1 to about 3:1. The concave reflecting surface 100 curves horizontally in a range from about 140 degrees to about 180 degrees, more preferably in a range from about 150 degrees to about 170 degrees and most preferably from about 160 degrees. The concave reflecting surface 100 curves vertically in a range from about 40 degrees to about 80 degrees, more preferably in a range from about 50 degrees to about 70 degrees and most preferably from about 58 degrees, and is coordinated with the height to width ratio of the images 165 projected by the at least one projector 60 of the image projection assembly 30.

Referring again to FIG. 1, the sound recording assembly 20 includes a plurality of microphones 720 in connection with a sound recorder 730. In use, the plurality of microphones 720 (shown are four microphones making up the plurality of microphones 720) are generally spaced apart and disposed to the left of the and to the right of the subject being recorded.

The sound system 90 includes at least a 8-channel unit 750 and a plurality of speakers 760. The plurality of speakers 760 are generally placed on the plurality of platforms 380 on the back 370 of the frame 330 behind the concave reflecting surface 100 of the screen. In particular, the plurality of speakers 760 may be placed at the following locations: a first speaker 762 is preferably placed left of the center of the concave reflecting surface 100, a second speaker 764 is preferably placed right of the center of the concave reflecting surface 100, a third speaker 766 is preferably placed near the first side 110 of the concave reflecting surface 100, and a fourth speaker 768 is placed near the second side 120 of the concave reflecting surface 100. The sound recording assembly 50 preferably utilizes a multi-track digital recorder 770 and the sound system 90 utilize a bank of amplifiers 780. A separate amp 790 can power each amplifier, and separate volume controls 800 can adjust the sound for each channel.

In use, a film crew conceives what they intend the audience to see, hear and experience and how the scene before the camera 40 of the image capturing assembly 20 as it will be perceived by the audience watching the system 10 in a theater 510. The fisheye element 250 bends light rays such that an images 165 enters the taking lens 230. The at least one enlarging elements 260 enlarges the images 165 inside the taking lens 230, so that the images 165 fills the entire area of a film negative. The at least one enlarging element 260 is utilized because the fisheye element 250 used, is smaller than a lens that would be traditionally used when capturing a movie image. The smaller lens size of the fisheye element 250 reduces the focal length thereby improving the depth of field and bringing more of the recorded images 165 into a sharp focus. The images 165 are then exposed onto the frame area of the negative in camera 40 of the image capturing assembly 20. The rate of exposure is in a range from about 1/10 to about 1/200, more preferably in a range from about 1/50 to about 1/150 and most preferably about 1/100th second, and the frame rate is in a range from about 10 to frames per second about 96, more preferably in a range from about 16 frames per second to about 60 frames per second, and most preferably about 48 frames per second which is generally twice the normal 24 frames per second used in traditional motion picture processes. This increased rate of exposure reduces motion blur and provides a sharper images 165 on the film.

During the filming process, if shooting sound on location, the plurality of microphones 720 are positioned relative to the camera 40 in an arrangement which substantially matches the positions of the plurality of speakers 760 relative to the concave reflecting surface 100. In this manner, the sounds recorded will correspond to their visual counterparts during exhibition. The sound is preferably digitally recorded on the multi-track digital recorder 770. The film and soundtrack are processed and edited in the same manner as conventional film.

In the theater 510 the film that has been captured by the image capturing assembly 20 and that is typically printed on 70 mm stock, passes through the at least one projector 60 of the image projection assembly 30 from about 10 frames per second to about 96 frames per second, more preferably in a range from about 16 frames per second to about 60 frames per second, but most preferably about 48 frames per second. A variable speed motor and a controller of the at least one projector 60 are used to sync the sound captured by the sound recording assembly 50 to the images 165 captured by the image capturing assembly 20, and so that adjustments can be made in the event that the soundtrack should get out of sync with the images 165. The speed adjustments are made by the variable speed motor of the at least one projector 60 only, as a variable change in sound by the sound system 90 would be noticeable as flutter and wow to the audience. The sound system 90 further includes a multi-track digital player for sound playback. Each track of the sound captured by the sound recording assembly 50 is fed through its own amplifier in the bank of amplifiers 780 and powers the plurality of speakers 760 placed behind the concave reflecting surface 100. The volume of each track can be separately controlled, and the volume of all the channels is adjustable.

A lamphouse 930, usually containing a xenon lamp 940, passes a light beam 950 through the frame 285, and into the compensating projection lens 290 (FIG. 6). The images 165 then pass through the at least one anamorphic elements 320 of the compensating projection lens 290 which thereby restores the ratio of the images 165 back to a range from about 2.4 to about 3.0, more preferably in a range from about 2.6 to about 2.8 and most preferably about 2.7:1. Other elements of the compensating projection lens 290 shoot the images 165 into a narrow beam which does not excessively expand in size after a significant distance from the at least one projector 60 of the image projection assembly 30.

This narrow beam reflects off the first mirror 170 positioned in front of the at least one projector 60. The first mirror 170 is flat and is angled so as to redirect the beam toward the second mirror 180 which is typically disposed near the center. The beam strikes the second mirror 180. The second mirror 180 is flat, and angled so as to redirect the beam toward the third mirror 190 typically disposed near the ceiling of the theater 510. The beam strikes the third mirror 190 located above, and slightly recessed behind, the concave reflecting surface 100. The third mirror 190 is flat and angled downward at approximately 10 degrees to about 50 degrees. The third mirror 190 redirects the beam to the fourth mirror 200. The fourth mirror 200 is positioned so as to reflect the beam back toward the concave reflecting surface 100 of the screen 80 and curved to evenly distribute the images 165 onto the concave reflecting surface 100 of the screen 80.

The images 165, when properly displayed on the concave reflecting surface 100 of the screen 80, will reproduce in substantially the same range and scope as captured by the camera 40 of the image capturing assembly 20. The projected images 165 will have no horizontal or vertical line distortions, be bright, sharp, and of high resolution. The sound, playing back in sync with the images 165, will issue from the plurality of speakers 760 behind the concave reflecting surface 100 of the screen 80 from points corresponding to its visual counterparts thereby achieving a three-dimensional visual and aural affect.

Those skilled in the art will readily understand and appreciate that the number of degrees of the field of view, the focal length, the size of the film and the ratios of the anamorphic elements, the number of mirrors, the shape of the mirrors, the positions of the mirrors, the angle of the louvers and the number of louvers can be varied and the system will generally continue to function as intended as long as the size of the field of view, the focal length of the camera, the size and shape of the screen, the angle and number of louvers, the ratios of the anamorphic elements, the size of the film and position of the projector relative to the screen are appropriately coordinated so as to achieve the desired three-dimensional effect. Those skilled in the art will also readily understand and appreciate that still other changes may be made in the construction and the operation of the various components, elements and assemblies described herein or in the steps or the sequence of steps of the methods described herein without departing from the spirit and scope of the invention as defined in the following claims.

What is claimed is:

1. A system for collecting and projecting an image so as to create a visual effect comprising:

an image assembly capable of collecting at least one image;

an image projection assembly capable of projecting the at least one image collected by the image collection assembly;

a plurality of mirrors wherein at least two of the plurality of mirrors have a curvature, wherein the curvature is selected from the group consisting of concave, convex, and a combination thereof, and the plurality of mirrors are disposed so as to be capable of reflecting the at least one image as it is being projected by the image projection assembly; and a screen assembly having a curvature disposed so as to be capable of receiving the at least one image being reflected from the plurality of mirrors to the screen, the screen assembly being operably associated with the image collection assembly, the image projection assembly, and the plurality of mirrors such that when the at least one image and is received by the screen assembly a visual affect is created.

2. The system of claim 1, wherein the at least one image is a plurality of images that are sequentially captured by the image capturing assembly and sequentially projected by the image projection assembly to thereby create a moving visual effect.

3. The system of claim 2, wherein the screen assembly has a concaved reflecting surface for receiving the plurality of the images.

4. The system of claim 3, wherein the visual effect is a three-dimensional effect.

5. The system of claim 4, further including a sound system.

* * * * *